United States Patent
Tracy et al.

(10) Patent No.: US 6,180,942 B1
(45) Date of Patent: Jan. 30, 2001

(54) ION DETECTOR, DETECTOR ARRAY AND INSTRUMENT USING SAME

(75) Inventors: David H. Tracy, Norwalk; Adam J. Patkin, Hamden; David G. Welkie, Trumbull; Michael I. Crockett, Newtown, all of CT (US)

(73) Assignee: PerkinElmer Instruments LLC, Norwalk, CT (US)

( * ) Notice: Under 35 U.S.C. 154(b), the term of this patent shall be extended for 0 days.

(21) Appl. No.: 09/180,157

(22) PCT Filed: Apr. 11, 1997

(86) PCT No.: PCT/US97/06077

§ 371 Date: Nov. 3, 1998

§ 102(e) Date: Nov. 3, 1998

(87) PCT Pub. No.: WO97/39474

PCT Pub. Date: Oct. 23, 1997

Related U.S. Application Data

(60) Provisional application No. 60/015,303, filed on Apr. 12, 1996.

(51) Int. Cl.[7] .................................................. H01J 49/02
(52) U.S. Cl. ........................... 250/299; 250/283; 250/397
(58) Field of Search ..................................... 250/283, 299, 250/397

(56) References Cited

U.S. PATENT DOCUMENTS

| | | | |
|---|---|---|---|
| 2,598,734 | * | 6/1952 | Washburn ............................ 250/299 |
| 4,473,748 | * | 9/1984 | Konagi et al. ....................... 250/299 |
| 5,548,121 | * | 8/1996 | Balmer et al. ....................... 250/397 |

* cited by examiner

*Primary Examiner*—Jack Berman
(74) *Attorney, Agent, or Firm*—St. Onge Steward Johnston & Reens LLC

(57) ABSTRACT

An array of ion detectors (30) comprising a plurality of pickup electrodes (20, 34) for receiving ions; a substrate (32); a plurality of insulators (22, 35) positioned respectively between said pickup electrodes (20, 34) and said substrate (32); a plurality of charge storage areas (12, 38) for storing charge received by said pickup electrodes (20, 34), wherein each area (12, 38) is connected to a particular pickup electrode (20, 34) and means (44) for determining the amount of charge collected by each charge storage area.

18 Claims, 5 Drawing Sheets

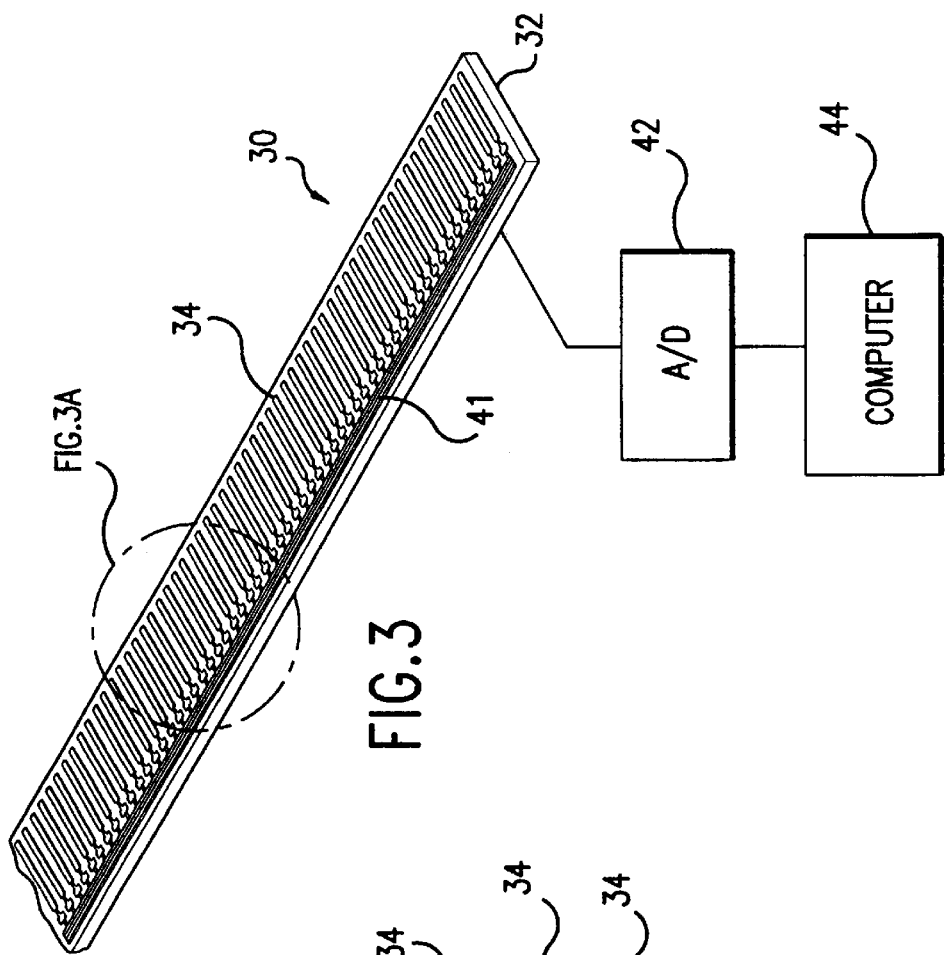
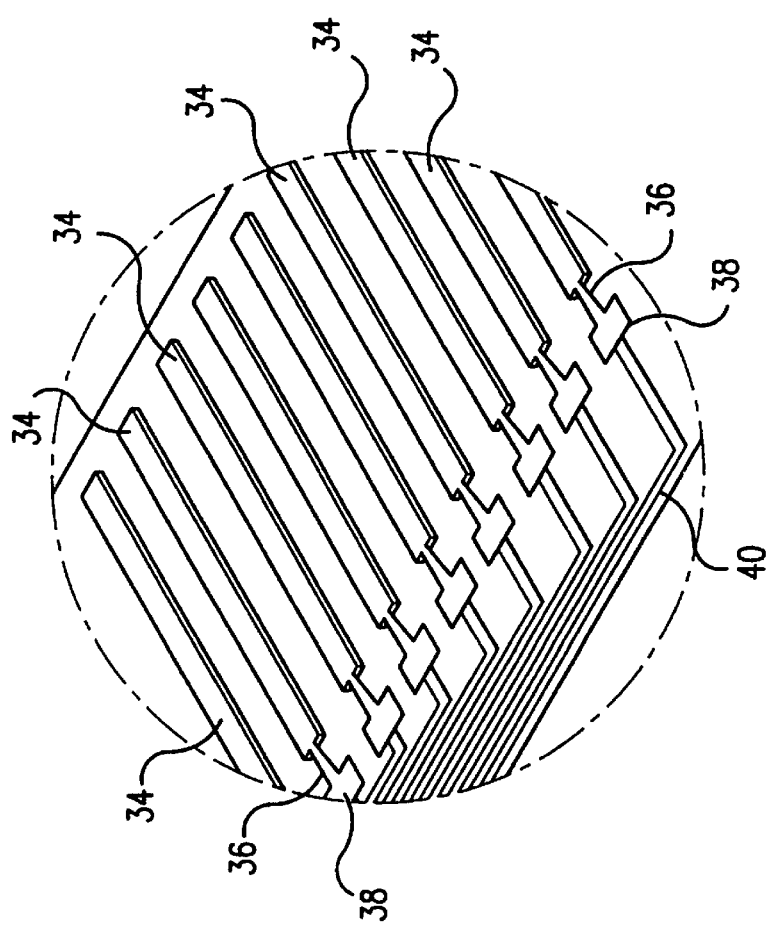
FIG. 3
FIG. 3A

ION DETECTOR, DETECTOR ARRAY AND INSTRUMENT USING SAME

This application claims benefit to Provisional Application 60/015,303 filed Apr. 12, 1996.

TECHNICAL FIELD

This invention relates to low noise solid state charge integrating detectors. More particularly, it relates to single channel ion and electron detectors and to ion and electron measuring array detectors.

BACKGROUND ART

Mass spectroscopy is just one of several analytical techniques which require ion or charged particle detectors. Other applications in which ion or charged particle detection is required include electron energy analyzers, electron capture detectors, flame ionization detectors, photoionization detectors, ion mobility spectrometers, smoke and particle detectors or any application in which ions in solutions are collected and measured. Typically in applications which require an array it is necessary to use a costly and complex micro channel plate, phosphor-fiber optic-photodiode array assembly to detect ions directly. In single channel applications it is possible to detect ions directly with a multiplier device such as an electron multiplier, a channel electron multiplier (CEM) or a discrete dynode electron multiplier. It is also possible to use a phosphor to convert ions to photons, and then detect them with a photomultiplier. A Faraday cup collector and an electometer may also be used.

Replacement of channel electron multipliers or other detectors in, for example, quadrupole mass spectroscopy and in other applications would be of value in providing cost savings and improved performance. Preferably a detector should be insensitive to vacuum quality and should not be adversely affected by exposure to atmosphere. Further, if at all possible, it should not require high voltages, should not exhibit mass discrimination, and should not respond to neutral particles or low energy photons.

U.S. Pat. No. 5,386,115 to Freidhoff et al. discloses a solid state mass spectrograph which includes an inlet, a gas ionizer, a mass filter and a detector array all formed within a cavity in a semiconductor substrate. The detector array is a linear array oriented in the dispersion plane of the mass filter and includes converging electrodes at the end of the cavity serving as Faraday cages which pass charge to signal generators such as charge coupled devices formed in the substrate but removed from the cavity.

SUMMARY OF THE INVENTION

It is an object of the invention to provide a charge sensitive detector that exhibits high sensitivity and dynamic range and which is insensitive to the gas pressure in the detector's environment.

In accordance with a first embodiment of the invention, high sensitivity and dynamic range can be achieved that are comparable to those achievable with electron multipliers, but without the incorporation of such a multiplier. Hence, in many applications that utilizes such a multiplier for signal amplification, the multiplier can be replaced with a much more cost effective charge sensitive detector in accordance with the invention without suffering significant loss in performance, while also reducing the requirement for high vacuum that may have been imposed by the use of the multiplier. The use of the detector in accordance with the invention also removes the requirement for high voltage that is otherwise required for operation of the electron multiplier. Further, and perhaps more significantly, such performance is achievable in environments where poor vacuum, or high gas pressures, exists, i.e., where electron multipliers can not be used due to their inherent requirement for a good vacuum environment. Hence, much higher sensitivities can be achieved in such high pressure environments than was previously achievable. Further, charged particles of much higher mass can be detected. In addition a detector according to the invention is insensitive to neutral atoms or molecules.

Using an integrated chip metallization for the pickup electrode, if of the order of 10 mm in diameter, would result in very high electrode capacitance, even with the thickest dielectric layers available in device manufacture. This high capacitance would make it impossible to achieve very low read noise levels.

A way to avoid this problem is to use an isolated pickup electrode, which may be made in any number of ways: machined metal, punched or electroformed metal, molded conductive material, conductively plated molded material, vapor deposited material, etc. An important aspect of the invention is to support the pickup electrode at sufficient distance from surrounding conductors, such as the device substrate, to reduce the electrode capacitance to a low value of, typically 1 pF or less. It is also necessary that the supporting structures have extremely low conductance, typically $10^{13}$ ohms, and that the dielectric constants and geometry of the supports be consistent with the low electrode capacitance to the surroundings.

If this is done, other problems arise. At the very low detection limits required, such structures will tend to be extremely sensitive to (a) microphonics and (b) stray electrostatic fields that are time-varying.

Microphonics, or induced voltage variations on the pickup electrode due to mechanical vibrations of the electrode or surrounding conduction structures, can be reduced or eliminated by (1) making the electrode and all surrounding structures very rigid and (2) by arranging for there to be no net charge on the pickup electrode. The vibration induced voltage on the electrode is proportional both to the vibration induced capacitance variation between the electrode and its surroundings, and to the charge on the electrode. By surrounding the electrode with a "Faraday Cage" biased to the potential of the pickup electrode, charge on the electrode is minimized. There are at least 2 options here: (1) Put a fixed bias on the Cage, or shield, which is nominally equal to the reset potential of the pickup electrode. This will result in immunity from microphonics at zero or very small ion currents, but as the signal increases, the electrode will acquire some charge toward the end of each integration cycle, and will be subject to microphonic noise. However, it is precisely at low signal levels that the lowest noise is required, so this is generally acceptable. Option (2) is to bootstrap the Faraday Cage potential to that of the electrode, tracking it during each integration. The effect is essentially to eliminate the effective capacitance of the pickup electrode, so that all charge accumulation is in the MOS circuit itself. This option is more complex, but offers potentially better performance and, if done carefully, permits larger detector areas to be realized.

The influence of stray AC fields can also be controlled by placing the pickup electrode within a cage, with apertures or grids provided to allow entrance of the ion flux which is to be measured. If the fields are very large, multiple layers of shielding may be required. The mean potential on the cage must be held within 1 mV or better of the optimum value, and AC components at frequencies which would interfere with the detection process must be held to microvolt levels or less.

It is also vital that any electrical leakage paths from the pickup electrode to any other conducting surfaces be minimized. In particular, the RC time constants should be kept 2–3 orders of magnitude higher than the desired integration cycle times, depending on the desired charge measuring accuracy. Small amounts of leakage may be dynamically calibrated away. In particular, any contamination of surfaces by material in the sample or sample beam, or sputtered from the detector assembly or elsewhere by sample ions, must not be allowed to form conductive paths. This goal can be achieved by appropriate geometrical design which physically shields critical surfaces from direct contamination.

In a second embodiment of the invention, charge supplied by an ion or electron current in vacuum or gas is deposited on an integrated electrode, typically of dimensions 10 um by 1000 um. This electrode is connected to a MOSFET circuit capable of resetting the voltage on the electrode to a preset value and then reading out the charge (voltage) on the electrode after a set integration time. The capacitance of the electrode and its associated circuit (FET gate, etc.) is typically 0.5 to 1 pF. A read noise level as low as several electrons is achieved. Alternatively CCD circuits can be used to detect the charge and provide signals indicative of the amount of charge present on the electrodes.

BRIEF DESCRIPTION OF THE DRAWINGS

FIG. 3 is an enlarged perspective view of an array detector in accordance with the invention.

FIG. 3A is a further enlarged portion of the array detector of FIG. 3.

DETAILED DESCRIPTION OF THE PREFERRED EMBODIMENTS

Figure 1:
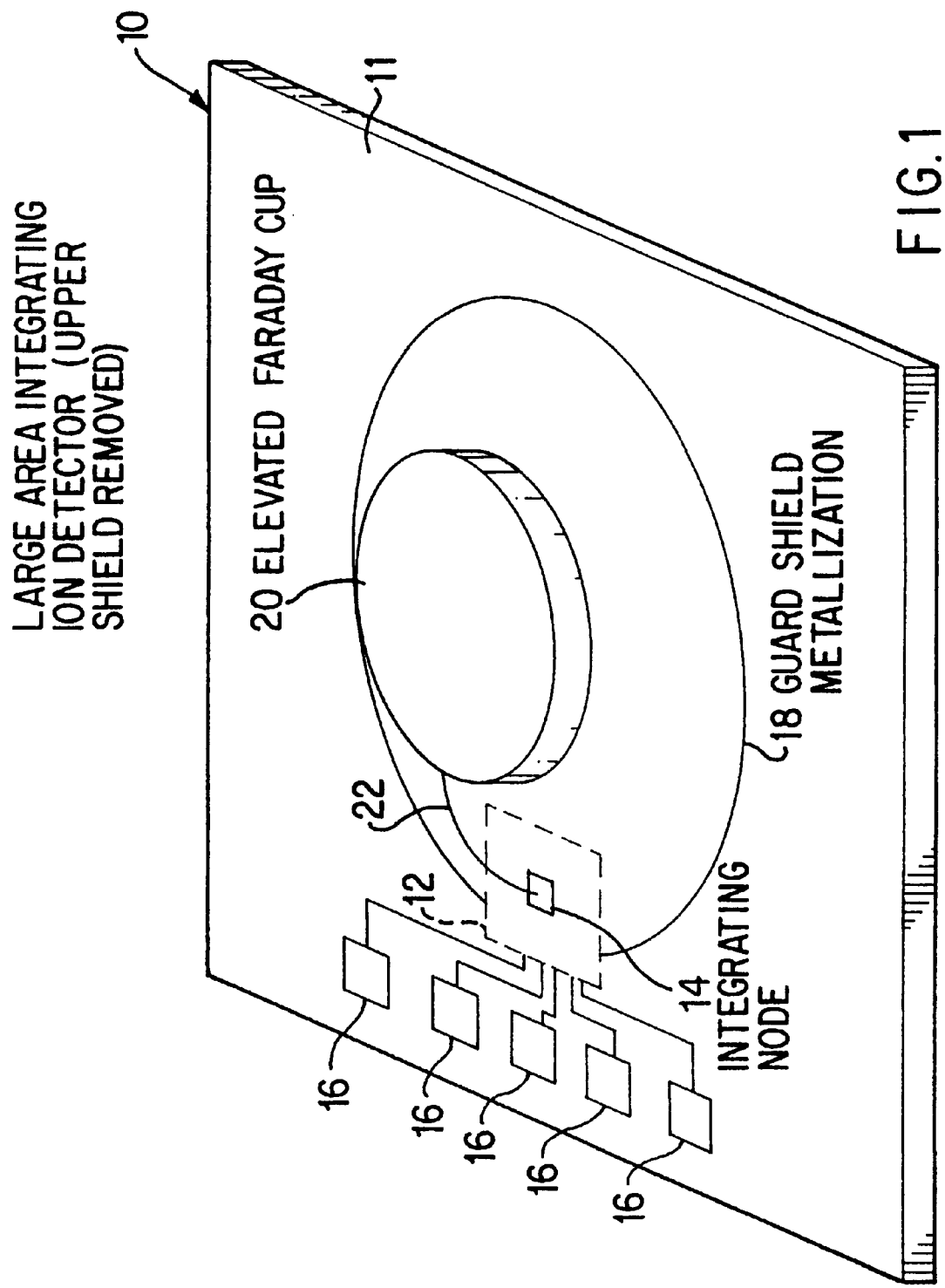
FIG. 1 is an enlarged perspective view of a single channel detector in accordance with the invention.

FIG. 1 shows schematically a first embodiment of the invention in the form of a charge integrating detector chip shown generally as 10 formed on a silicon substrate 11 with an integrated charge detection circuit 12 having a small exposed bonding signal pad 14 for signal pickup. There are also a number of normal bonding pads 16 for external connections to the chip. A large area metallization region, or other conductive surface, is provided as the bottom part of a Faraday shield. It may be interrupted by the circuit traces, or it may be a second metallization covering substantially all the chip area except for the signal pad 14. A pickup electrode 20 is shown suspended above the chip, with a bonding wire 22 attaching it to the signal node. Supports for the pickup electrode 20 and a top shield are not shown in FIG. 1.

The pickup electrode 20 may be in the form of a flat plate of any shape, a cup, or of other suitable form. To reduce scattering and secondary electron emission, it may have a multiwell configuration, such as a honeycomb, so that ions are actually trapped within deep columnar structures and any scattered or secondary ions will require multiple bounces to escape.

Figure 2:
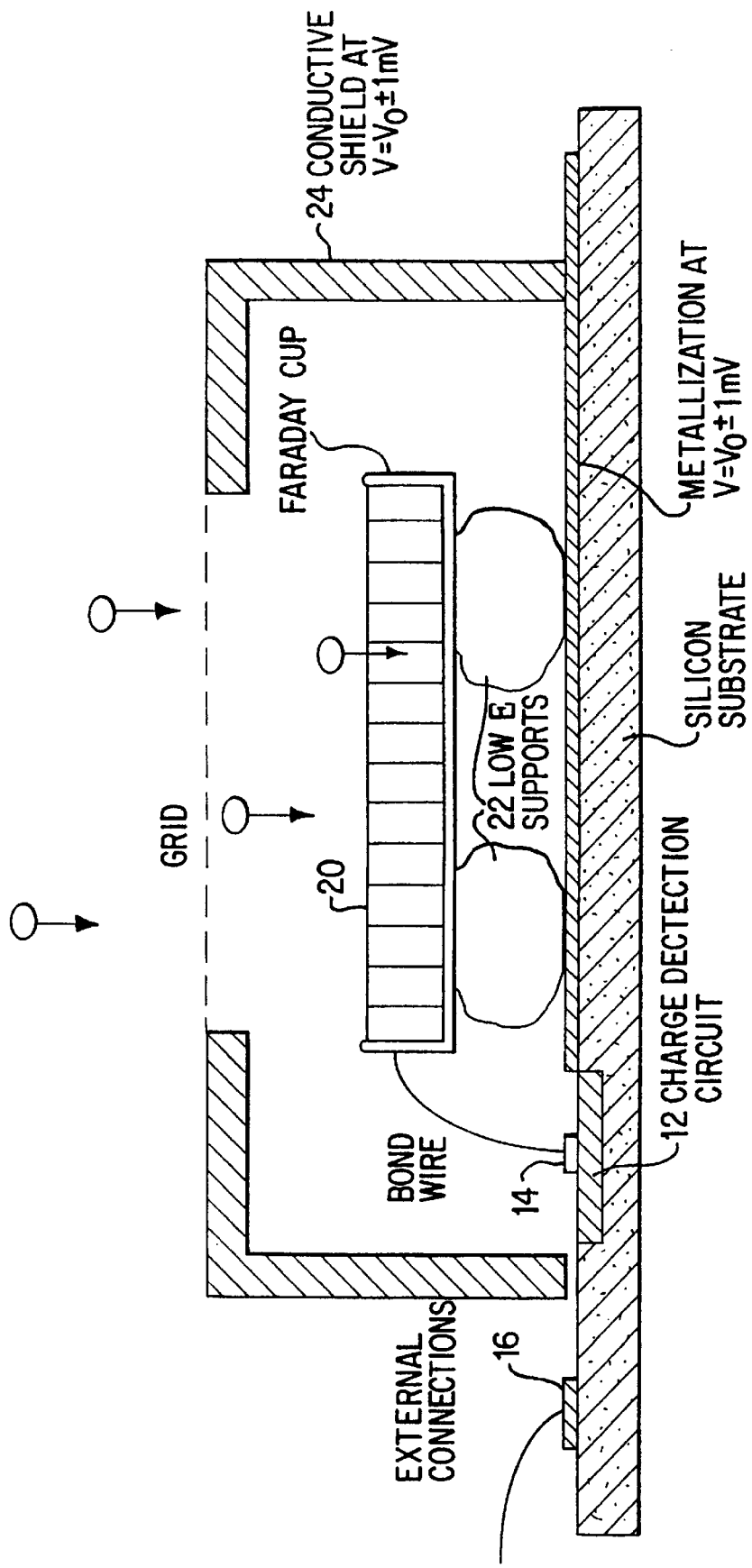
FIG. 2 is a further enlarged cross-sectional view of the detector of FIG. 1.

FIG. 2 shows a cross section of the complete detector, including the electrode supports 22 and the top shield 24, which is electrically connected to the bottom shield metallization region 18, which, as indicated previously, is electrically biased to a potential very near the signal node potential (the potential of pad 14). Electrode supports 22 may be of many forms: The electrode 20 may be supported by one or more globs of low dielectric constant, highly insulating polymer or other material, such as an open cell foam adhesive. Alternatively, electrode 20 may be supported by three or more low cross section solid dielectric legs or supports, or by a sufficiently thick (many mm) solid dielectric layer. The dimensions shown, an 8 mm diameter pickup located 2 mm from both the top and bottom of the Faraday Cage, result in a pickup capacitance of approximately 0.5 pF. The dimensions can be adjusted to achieve lower capacitance, or similar capacitance with larger pickup area.

Referring to FIG. 3, the principles of the present invention are applied to a second embodiment of the invention in the form of an integrated array detector shown generally as 30. Array detector 30 is formed on a silicon substrate 32. The array includes numerous detector elements 34 which may be formed of aluminum, or other conductive material, or by reactive ion etching of a more refractory material such as tungsten which is resistant to sputtering. As may be seen in FIG. 3A, each detector element 34 is connected by an extension 36 of its metalization to a charge storage circuit 38. The array elements may be of any shape, and spaced uniformly or non-uniformly. Charge storage circuit 38 may be a MOSFET circuit or a CCD circuit as described above.

The output of each charge storage circuit 38 is connected to an output line 40. Lines 40 form a signal bus 41. The voltage output of each line 40 is multiplexed with a multiplexer circuit (not shown in FIG. 3) to an analog to digital converter 42 and eventually sent to a computer 44 which acquires, stores and analyzes the data obtained by array detector 30.

Figure 4:
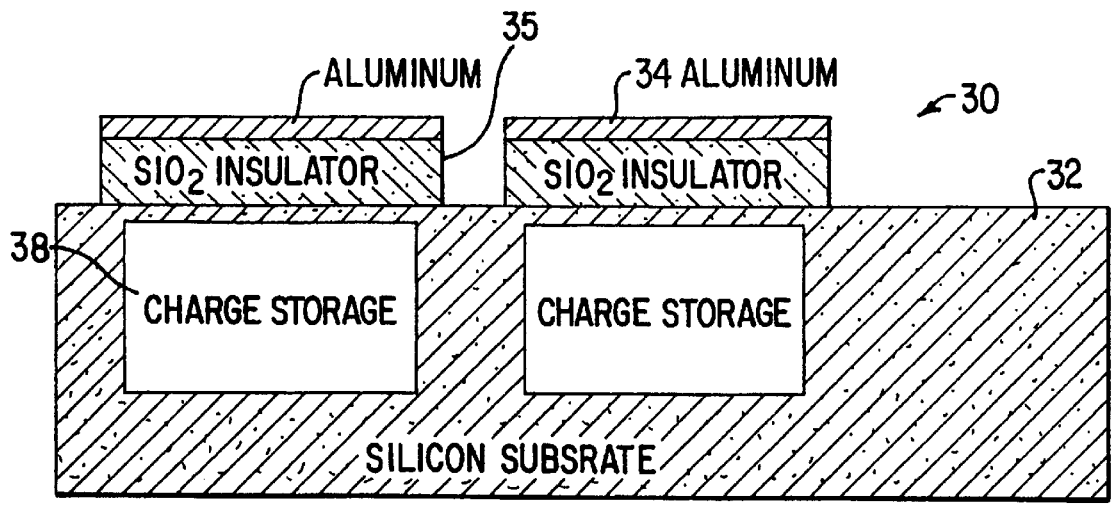
FIG. 4 is an enlarged schematic cross sectional view of the array of FIG. 3.

Referring to FIG. 4, each detector element 34 has an insulating material 35 under it and therefore disposed between detector element 34 and substrate 32 to prevent voltage breakthrough and to minimize the capacitance to substrate 32. Insulating material 35 may be, for example, a 3 $\mu$m thick layer of silicon dioxide. Other thicknesses or materials such as silicon nitride or a polyimide may also be used, alone or in combination.

Each detector element 34 may have a length of two millimeters, be spaced 12.5 $\mu$m center to center with a 2 $\mu$m gap between adjacent elements 34. A typical array may include 1,024 electrodes. However, smaller or larger numbers may be present and an array may include 4,000 or more detector elements.

Each charged storage circuit 38 may be operated in a quadruple correlated sampling (QCS) or double correlated double sampling (DCDS) mode. Thus, the stored voltage is measured before sampling when no signal has been accumulated and after sampling. Each measurement is further compared to a first reference (the reset voltage) to eliminate both thermodynamic $(kTC)^{1/2}$ reset noise and 1/f amplifier noise. Thus, four measurements are taken:

(1) While reset switch is on (clamped to bias reference)
(2) After reset (3) At end of integration (4) During reset clamp The difference between measurements (1) and (2) is the kTC reset noise $q_v$. The difference between measurements (3) and (4) is the final charge $Q_F$.

Thus, the detected charge is:

$$Q_D = Q_F - Q_N = (3)-(4)-[(2)-(1)]$$

Measurement (4) can be used as measurement (1) for next integration interval.

Figure 5:
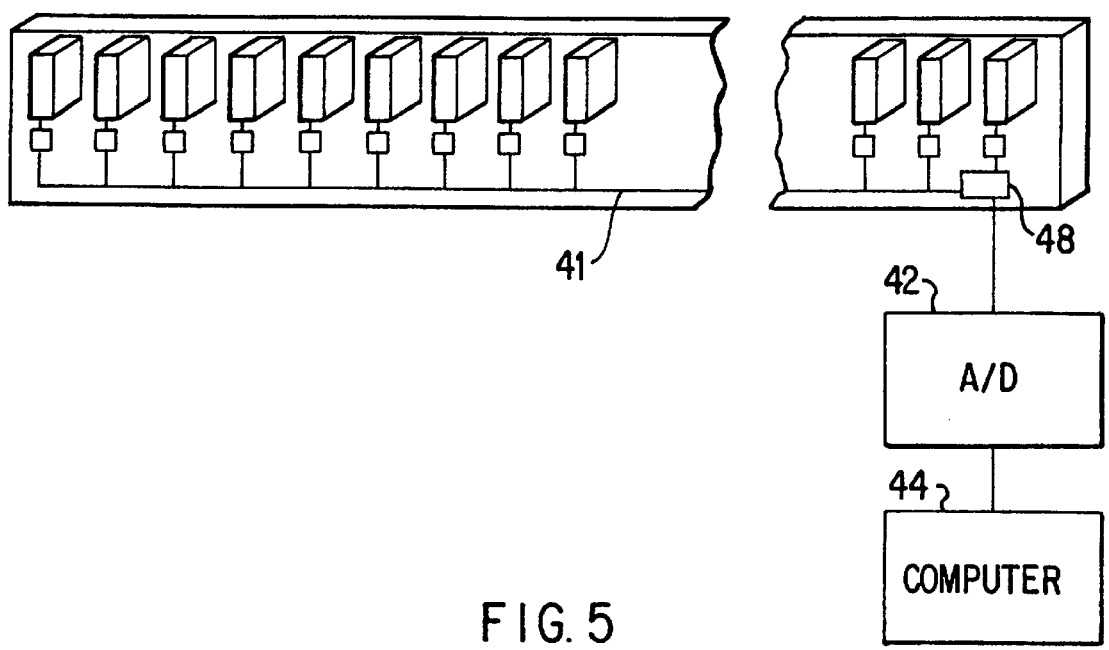
FIG. 5 is a simplified schematic diagram of the array of FIG. 3.

Referring to FIG. 5, a multiplexing circuit 48 connected to signal bus 41 is used to successively read out the voltages stored on charge storage circuits 38 by supplying the output voltage to A to D converter 42.

Figure 6:
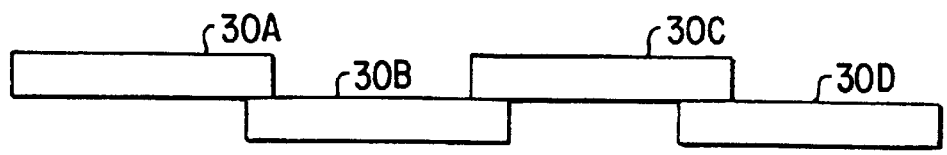
FIG. 6 is a diagram of the manner in which a large array may be constructed from several small arrays.

Referring to FIG. 6, a plurality of array detectors 30A, 30B, 30C and 30D are tiled together to form an extended array. Each detector is shown in plan view and the beam of ions is perpendicular to the plane of the figure. The ion beam is assumed to be at least twice as wide as the detectors so that one half of the beam impinges on detectors 30A and 30C while the other half impinges on detectors 30B and 30D. This results in a reduction in sensitivity by a factor of approximately two. However, this arrangement avoids the "black line" problem of having spaces in the extended array so that when it is used as a detector in an image plane application there are locations at which no charged particles are detected.

Figure 7:
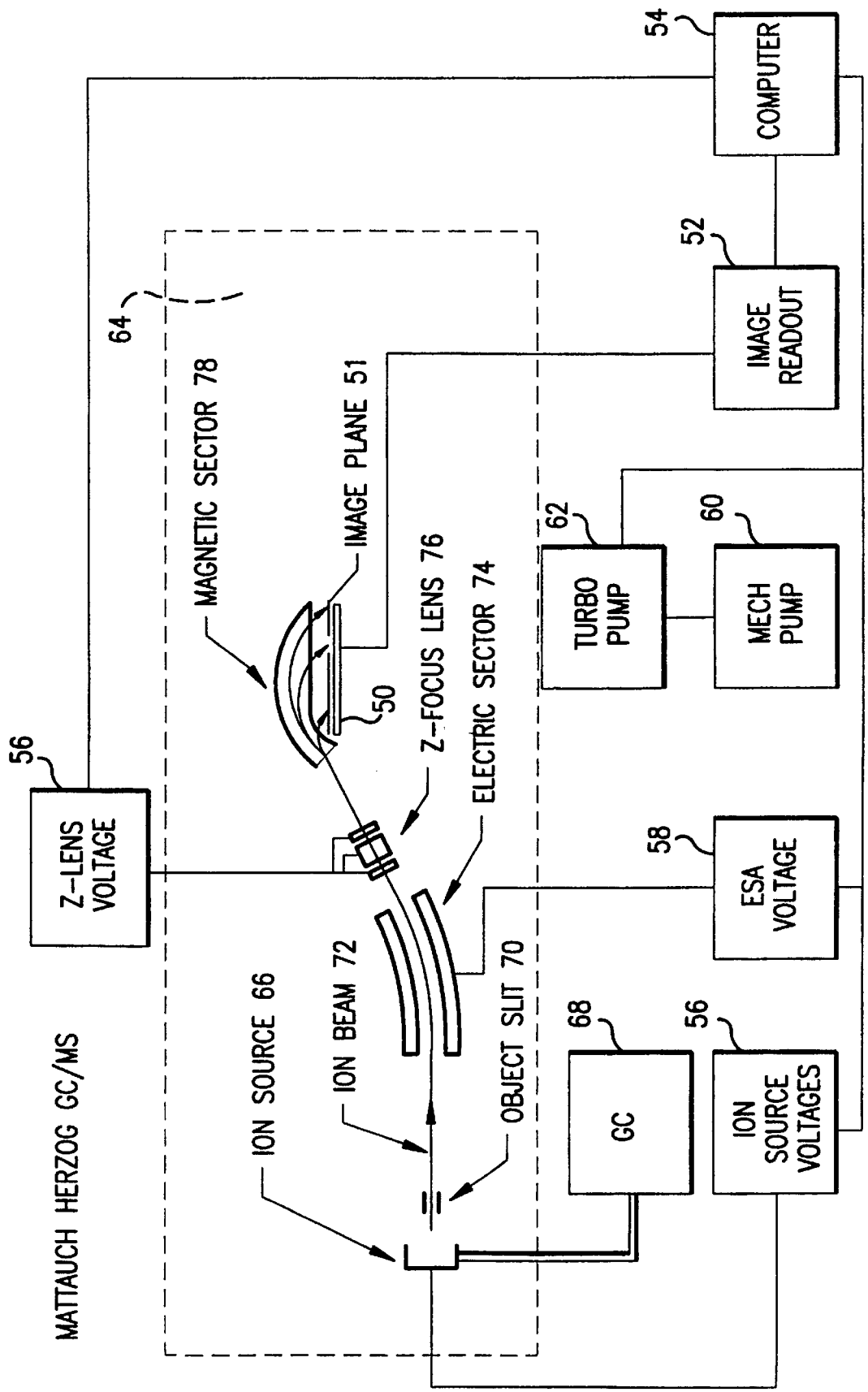
FIG. 7 is a block diagram of a spectrometer using an array detector in accordance with the invention.

Referring to FIG. 7, a Mattauch-Herzog mass spectroscopy system (which may be combined with a gas chromagraph) utilizes a detector 50 in accordance with the invention placed in an image plane 51. The signals from the elements of detector 50 are provided to an image readout circuit 52 analogous to the analog to digital converter circuit 42 described above. A computer 54 is analogous to computer 44 previously described, but may also be used to control other functions within the spectrometer such as the Z-lens voltage circuit 56.

As is well known in the art, computer 54 may also control an ion source voltage circuit 56 and an electrostatic analyzer voltage circuit 58. In a mass spectrometer the electrostatic analyzer provides a charged particle beam of relatively constant energy so that subsequent sorting by momentum will translate into sorting by mass as energy is held substantially constant.

Other signals may be exchanged between computer 54 and a mechanical roughing pump 60 which backs a turbomolecular pump 62 which also interchanges signals with computer 54. However, if the detector 50 in accordance with the invention is used, in many applications turbomolecular pump 62 will not be necessary.

Pump 60 (and possibly turbomolecular pump 62) evacuate a chamber 64 which includes an ion source 66. The ions may be those eluted from the column of a gas chromatograph 68. These ions pass through an object slit 70 and form an ion beam shown generally as 72. Beam 72 passes through an electric sector 74 and a Z focus lens 76 before entering a magnetic sector 78. In magnetic sector 78 the ions are dispersed according to the square root of their mass thus producing a spectrum of mass versus position in the image plane 51.

The detector 50 of the present invention has a dynamic range of approximately six orders of magnitude. Greater dynamic range can be achieved by modulation of the ion current or by changing the rate of readout which may be in the order of 100 times per second, but can be varied depending upon the application. Further, the detector according to the invention is sensitive to a mass range of 1 to at least 1,000 atomic mass units, but in principle the mass range may be especially unlimited.

Various engineering considerations will occur to those skilled in the art. For example, those portions of the array associated with on-chip charge storage transfer, applification and digitization should be shielded from ion and photon bombardment. This can be accomplished by suitable passivation and metalization coatings or external shields. Further, charge buildup between electrodes and other metalizations can be minimized by the use of suitable guard rings. Finally an array in accordance with the invention can be mounted in an integrated circuit chip package for ease of handling or onto a custom purpose package for ease of positioning in the image plane 51.

We claim:

1. An array of ion detectors comprising:

a plurality of pickup electrodes for receiving ions;

a substrate;

a plurality of insulators positioned respectively between said pickup electrodes and said substrate;

a plurality of charge storage areas for storing charge received by said pickup electrodes, wherein each area is connected to a particular pickup electrode; and means for determining the amount of charge collected by each charge storage area.

2. The apparatus according to claim 1 further comprising a multiplexer for providing a multiplexed output indicative of the amount of charge in said charge storage areas.

3. The apparatus according to claim 1 as used in a mass spectrometer including an ion source, an ion separator and a vacuum means.

4. The apparatus according to claim 3, wherein the vacuum means consists of a roughing pump.

5. An ion detector comprising:

a pickup electrode for receiving ions;

a voltage plane;

a shield in close electrical contact with said voltage plane such that the combination of said shield and said voltage plane form a Faraday cage;

means for electrically biasing said Faraday cage;

means for supporting said pickup electrode within said Faraday cage to achieve a desired spatial relationship and capacitance between said pickup electrode and said Faraday cage;

charge detection circuitry having an input and an output, said charge detection circuitry for detecting said ions received by said pickup electrode;

means for connecting said pickup electrode to said charge detection circuitry input;

means for producing a pickup electrode reference voltage; and means for applying said pickup electrode reference voltage to said pickup electrode.

6. The apparatus according to claims 5 wherein said shield is provided with apertures or grids to allow ions to impinge on to said pickup electrode.

7. The apparatus according to claims 5 wherein said means for electrically biasing said Faraday cage further comprises means for maintaining said Faraday cage at said pickup electrode reference voltage.

8. The apparatus according to claim 5 wherein said means for electrically biasing said Faraday cage further comprises means for maintaining said Faraday cage at the same potential as said pickup electrode.

9. The apparatus according to claim 5 wherein said means for supporting said pickup electrode within said Faraday cage achieves a capacitance between said pickup electrode and said Faraday cage of less than 1 pf.

10. A mass spectrometer comprised of at least an ion source, an ion separator and an ion detector wherein said ion detector comprises:

a pickup electrode for receiving ions;

a voltage plane;

a shield in close electrical contact with said voltage plane such that the combination of said shield and said voltage plane form a Faraday cage;

means for electrically biasing said Faraday cage;

means for supporting said pickup electrode within said Faraday cage to achieve a desired spatial relationship and capacitance between said pickup electrode and said Faraday cage;

charge detection circuitry having an input and an output, said charge detection circuitry for detecting said ions received by said pickup electrode;

means for connecting said pickup electrode to said charge detection circuitry input;

means for producing a pickup electrode reference voltage; and means for applying said pickup electrode reference voltage to said pickup electrode.

11. The apparatus according to claim 10 wherein said shield is provided with apertures or grids to allow ions to impinge on to said pickup electrode.

12. The apparatus according to claim 10 wherein said means for electrically biasing said Faraday cage further comprises means for maintaining said Faraday cage at said pickup electrode reference voltage.

13. The apparatus according to claim 10 wherein said means for electrically biasing said Faraday cage further comprises means for maintaining said Faraday cage at the same potential as said pickup electrode.

14. The apparatus according to claim 10 wherein said means for supporting said pickup electrode within said Faraday cage achieves a capacitance between said pickup electrode and said Faraday cage of less than 1 pf.

15. A method of detecting ions comprising:

forming a Faraday cage from a combination of a voltage plane and a shield, said voltage plane and said shield being in close electrical contact;

electrically biasing said Faraday cage;

supporting a pickup electrode within said Faraday cage to achieve a desired spatial relationship and capacitance between said pickup electrode and said Faraday cage;

producing a pickup electrode reference voltage;

firstly applying said pickup electrode reference voltage to said pickup electrode;

measuring the pickup electrode potential while said pickup electrode reference voltage is firstly applied;

disconnecting said pickup electrode reference voltage from said pickup electrode measuring the pickup electrode potential immediately after disconnecting said pickup electrode reference voltage from said pickup electrode allowing electrons to impinge on to said pickup electrode measuring the pickup electrode potential immediately after allowing electrons to impinge on to said pickup electrode secondly applying said pickup electrode reference voltage to said pickup electrode;

secondly measuring the pickup electrode potential while said pickup electrode reference voltage is applied;

calculating the charge accumulated on said pickup electrode using the formula: $Q_D = E_e - E_r - (E_i - E_o)$ where $Q_D$ is the accumulated charge, $E_e$ is said pickup electrode potential immediately after allowing electrons to impinge on to said pickup electrode, $E_r$ is said pickup electrode potential secondly measured while said pickup electrode reference voltage is applied, $E_i$ is said pickup electrode potential immediately after disconnecting said pickup electrode reference voltage from said pickup electrode and $E_0$ is said pickup electrode reference voltage firstly applied to said pickup electrode.

16. The method according to claim 15 wherein electrically biasing said Faraday cage further comprises maintaining said Faraday cage at said pickup electrode reference voltage.

17. The method according to claim 15 wherein electrically biasing said Faraday cage further comprises maintaining said Faraday cage at the same potential as said pickup electrode.

18. The method according to claim 15 wherein supporting said pickup electrode within said Faraday cage achieves a capacitance between said pickup electrode and said Faraday cage of less than 1 pf.

* * * * *